United States Patent [19]

Mitchell

[11] 4,155,587

[45] May 22, 1979

[54] MOVABLE AUTOMOBILE SEAT

[76] Inventor: Richard H. Mitchell, 29 Cedar St., Foxboro, Mass. 02035

[21] Appl. No.: 844,926

[22] Filed: Oct. 25, 1977

[51] Int. Cl.² ............................................... B60N 1/10
[52] U.S. Cl. .................................... 296/65 R; 5/81 B; 297/346
[58] Field of Search ...................... 296/65 R, 68, 65 A; 180/6.5; 297/345–349; 5/81 R, 81 A

[56] References Cited

U.S. PATENT DOCUMENTS

| | | | |
|---|---|---|---|
| 2,792,951 | 5/1957 | White | 297/349 X |
| 2,864,431 | 12/1958 | Eaton | 297/347 |
| 3,288,234 | 11/1966 | Feliz | 296/65 R X |
| 3,338,622 | 8/1967 | Bachmann | 296/65 R |
| 3,905,436 | 9/1975 | Karchak et al. | 296/65 R X |

Primary Examiner—Joseph F. Peters, Jr.
Assistant Examiner—Gene A. Church
Attorney, Agent, or Firm—Wolf, Greenfield & Sacks

[57] ABSTRACT

A movable automobile seat for handicapped persons which includes a base plate secured to the floor of the vehicle behind the steering wheel, a trolley movable on the base plate, a seat frame mounted on the trolley and carrying the vehicle seat, guide means on the base plate and trolley which confine the horizontal motion of the seat frame to a course having a first position wherein the vehicle seat is in the normal position for driving behind the steering wheel and a second position wherein the seat lies wholly outside the vehicle, and lift means for raising and lowering the seat frame with the seat when located outside the vehicle permitting the seat to be lowered to a position within a few inches of the ground.

15 Claims, 11 Drawing Figures

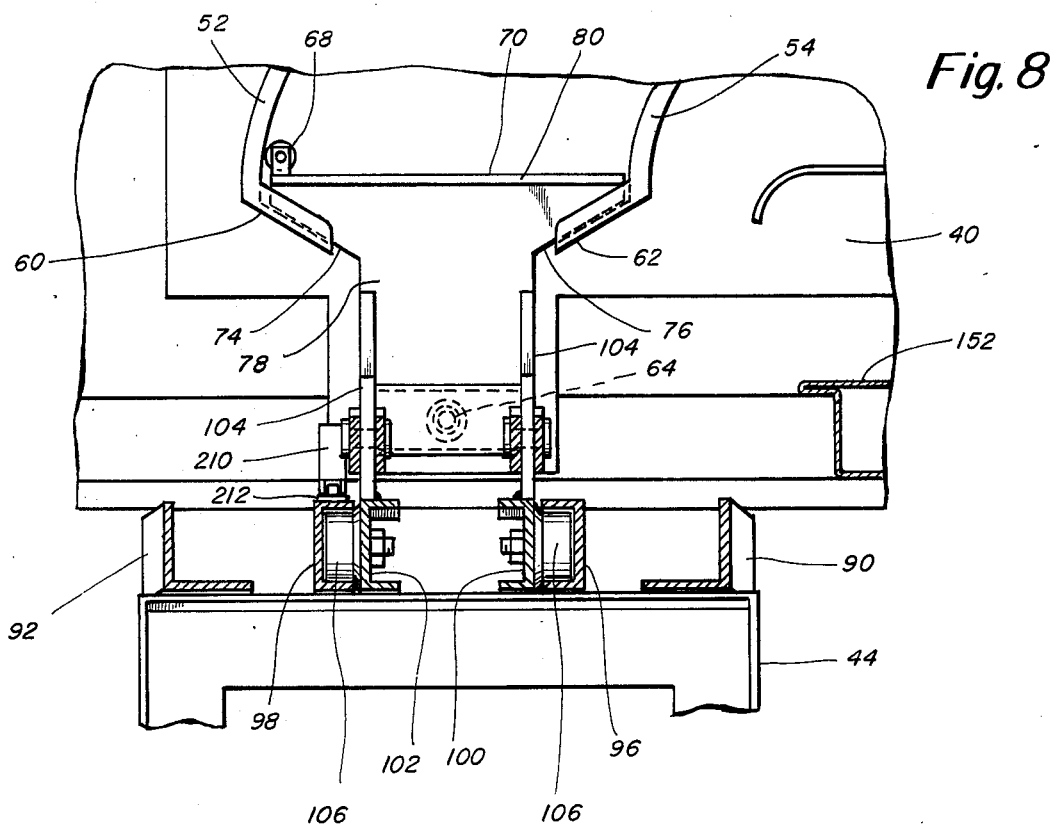
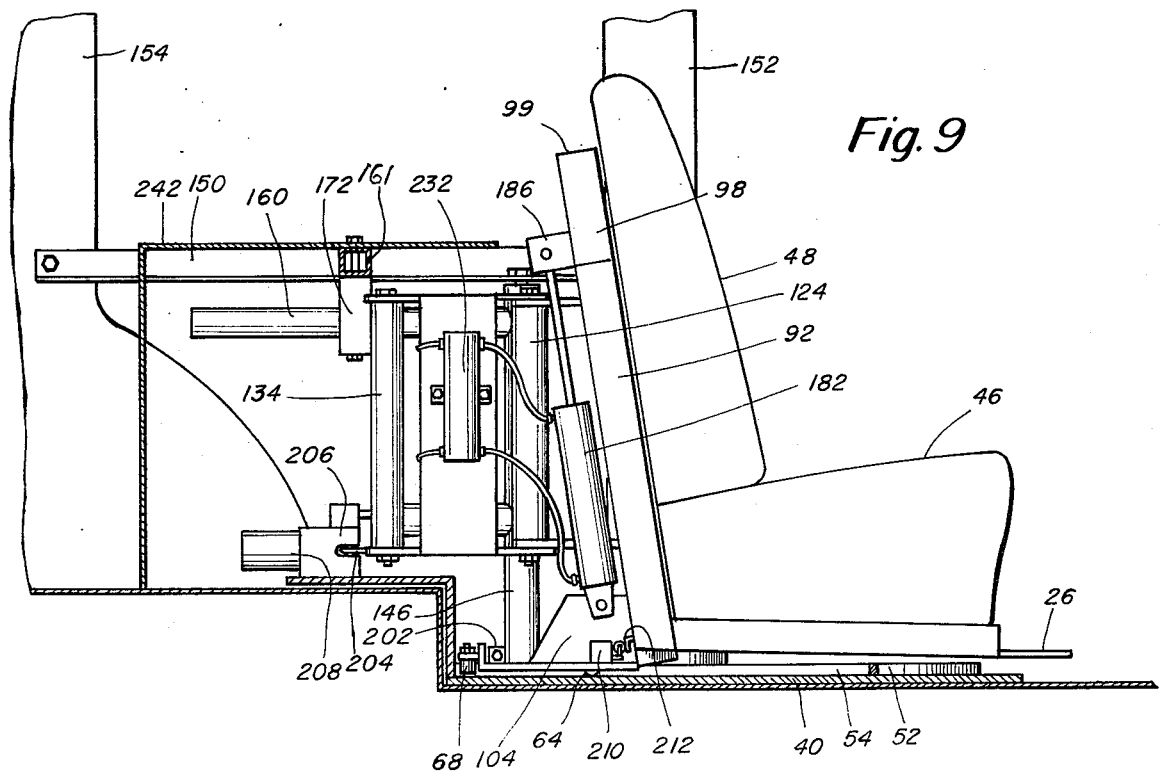

MOVABLE AUTOMOBILE SEAT

INTRODUCTION

This invention relates to vehicle seats and more particularly comprises a new and improved vehicle seat designed for use by handicapped persons to enable them to get in and out of a vehicle with ease.

In recent years there have been a number of devices developed which enable handicapped persons to operate motor vehicles. Many of these devices are in common use and are of very significant assistance to the handicapped. These devices, while providing assistance to the handicapped in the operation of the vehicle, do not however assist the handicapped in entering and alighting from the vehicle.

The principal object of this invention is to provide a vehicle seat which literally may be extended from the vehicle itself so as to enable the handicapped to more readily enter and leave the vehicle. The device has application both to the driver's seat as well as the passenger seats of a vehicle.

At the present time a handicapped person such as a paraplegic normally enters an automobile by positioning himself in his wheelchair immediately adjacent the open door and literally lifts himself into the vehicle by means of the door frame, automobile seat and other reachable parts of the automobile body. Needless to say, this is a very difficult task. And the problem of alighting from the vehicle is almost as difficult.

In accordance with the present invention the automobile seat is mounted on a trolley which in turn moves along a base plate secured to the automobile frame. The trolley moves along a path between a first position wherein the seat is positioned in an appropriate location for the user to operate the vehicle (if the invention is incorporated into the driver's seat) and a second position wherein the seat lies wholly outside the automobile suspended from the trolley which is disposed inside the vehicle at the door. The seat may be raised and lowered on the trolley when the seat is outside the vehicle. In its raised position the seat may be returned to the first position within the vehicle, and in the lowered position, the occupant may most readily be seated in or alight from it. The various motions provided for the seat are hydraulically actuated, and a control panel mounted in the vehicle in a position readily accessible to the seat occupant in all positions of the seat controls the actuating mechanism.

These and other objects and features of this invention will be better understood and appreciated from the following detailed description of one embodiment thereof, selected for purposes of illustration and shown in the accompanying drawing.

BRIEF FIGURE DESCRIPTION

Figure 5:
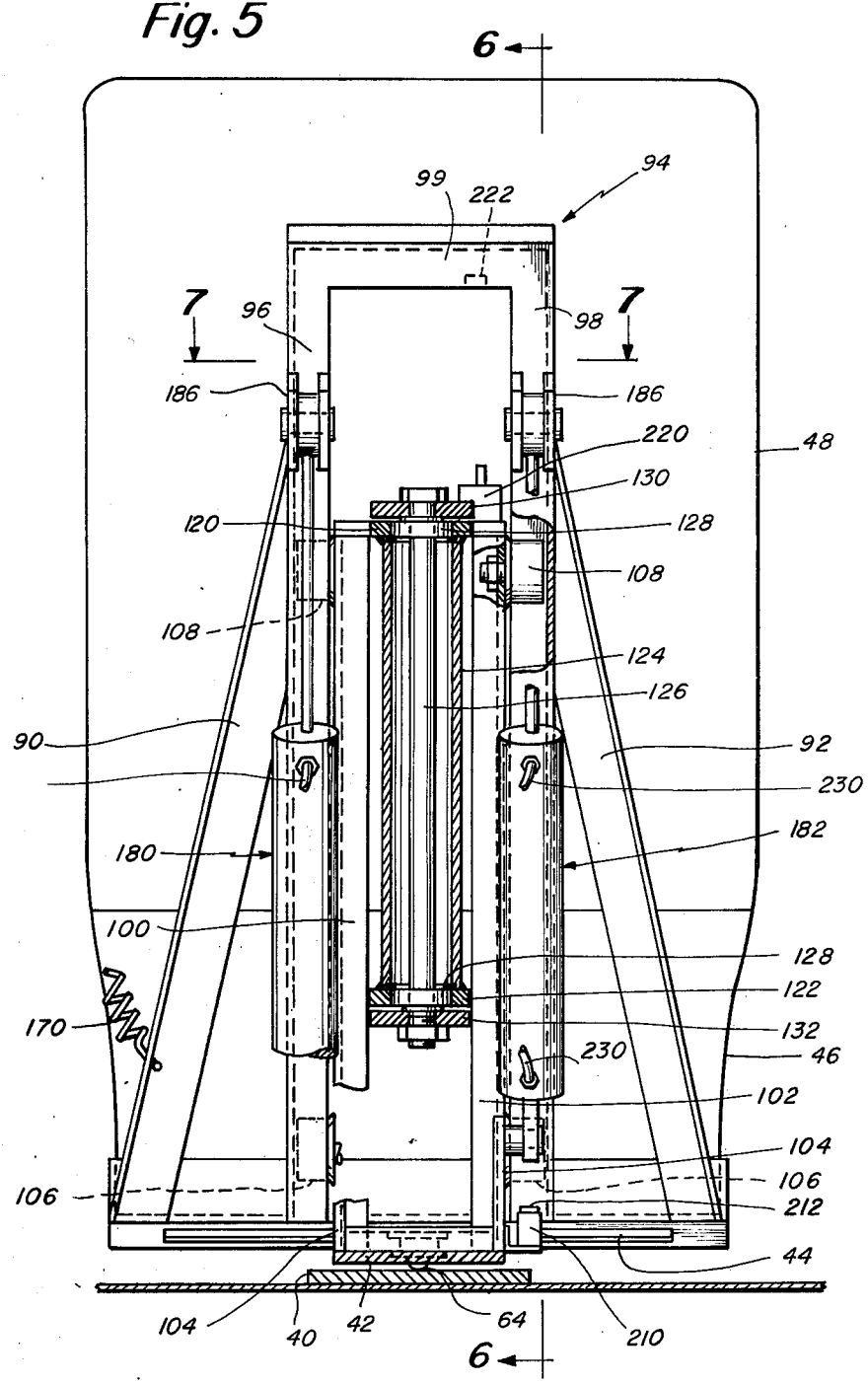
FIG. 5 is a rear view of the seat showing the mechanism for raising and lowering it.
Figure 6:
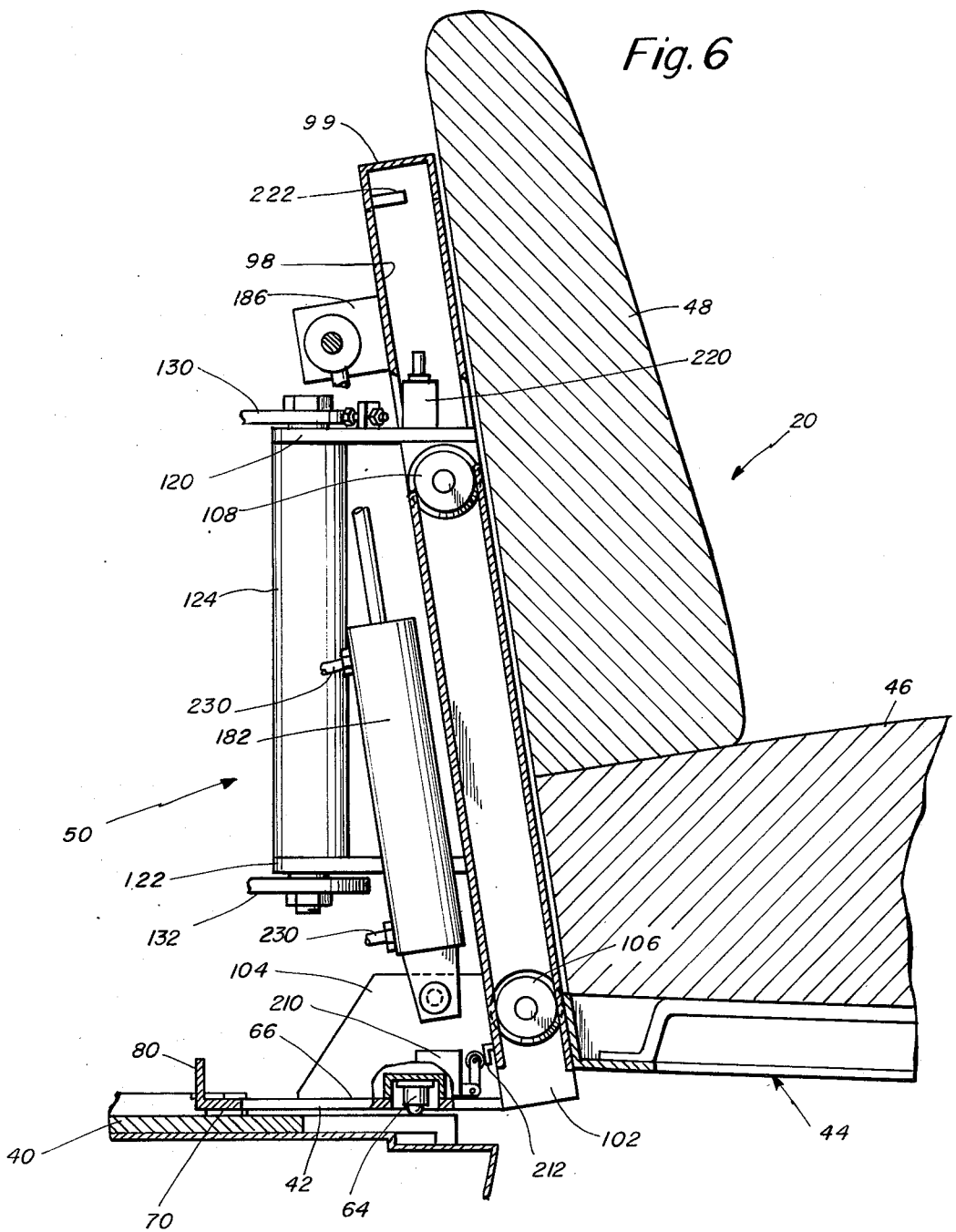

FIGS. 6 and 7 are cross sectional views taken along the corresponding section lines 6—6 and 7—7 in FIG. 5.

Figure 3:
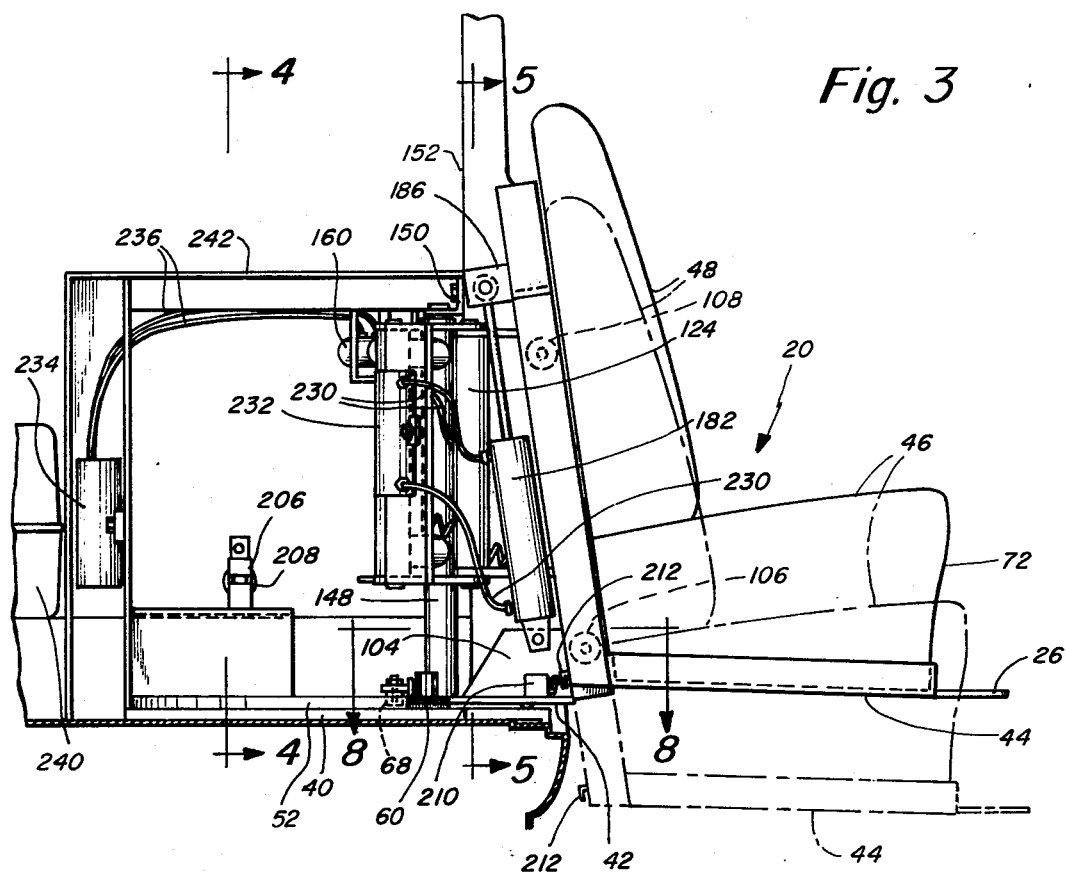
FIG. 3 is a fragmentary side view of the seat and its supporting mechanism in the extended position of FIGS. 1 and 2.

FIG. 8 is a cross sectional view taken along the corresponding section line 8—8 of FIG. 3.

FIG. 9 is a view similar to FIG. 3 but showing the seat in its retracted position within the vehicle.

Figure 2:
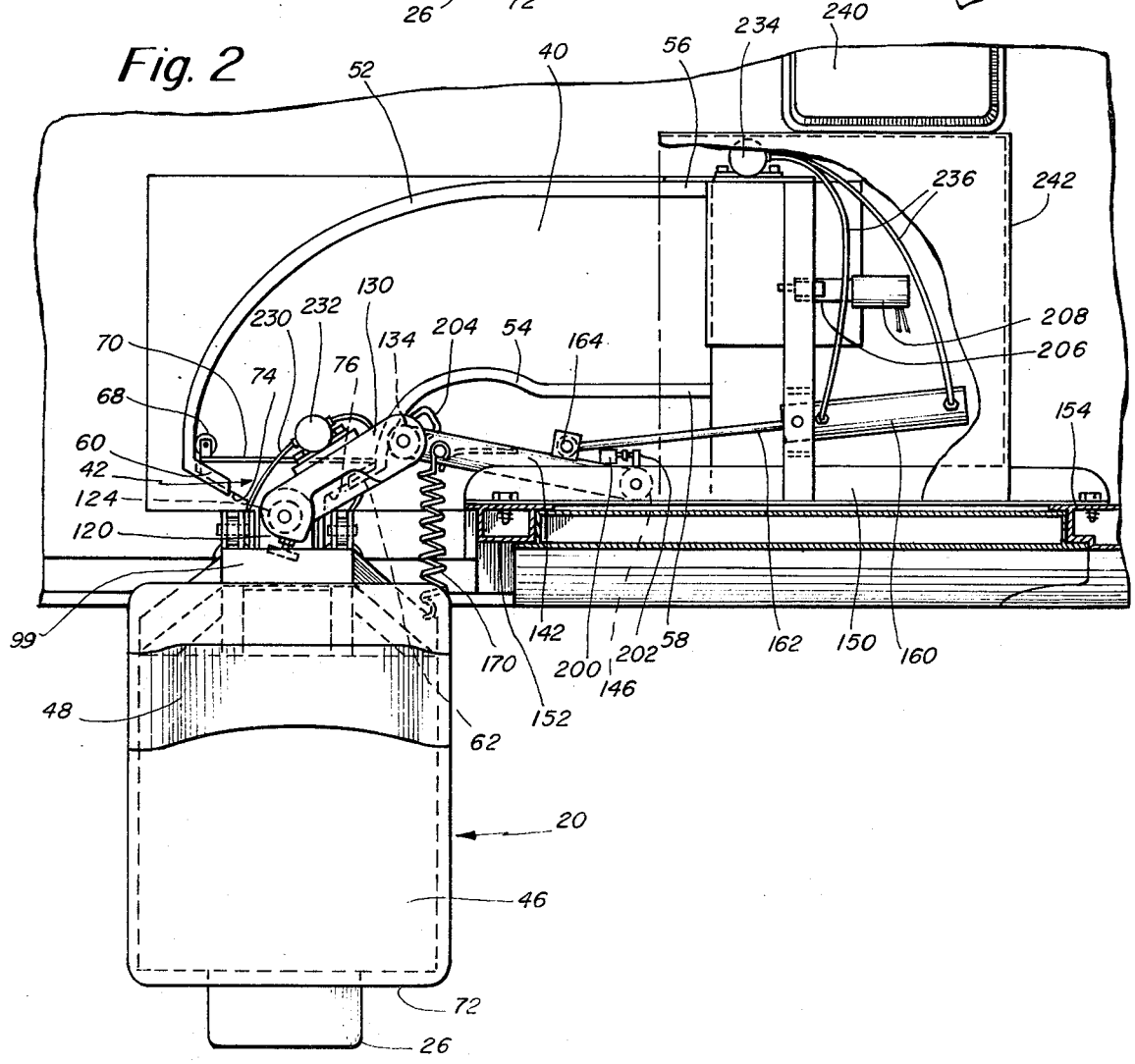
FIG. 2 is a fragmentary plan view of the driver's seat and its supporting structure shown in the position of FIG. 1.
Figure 10:
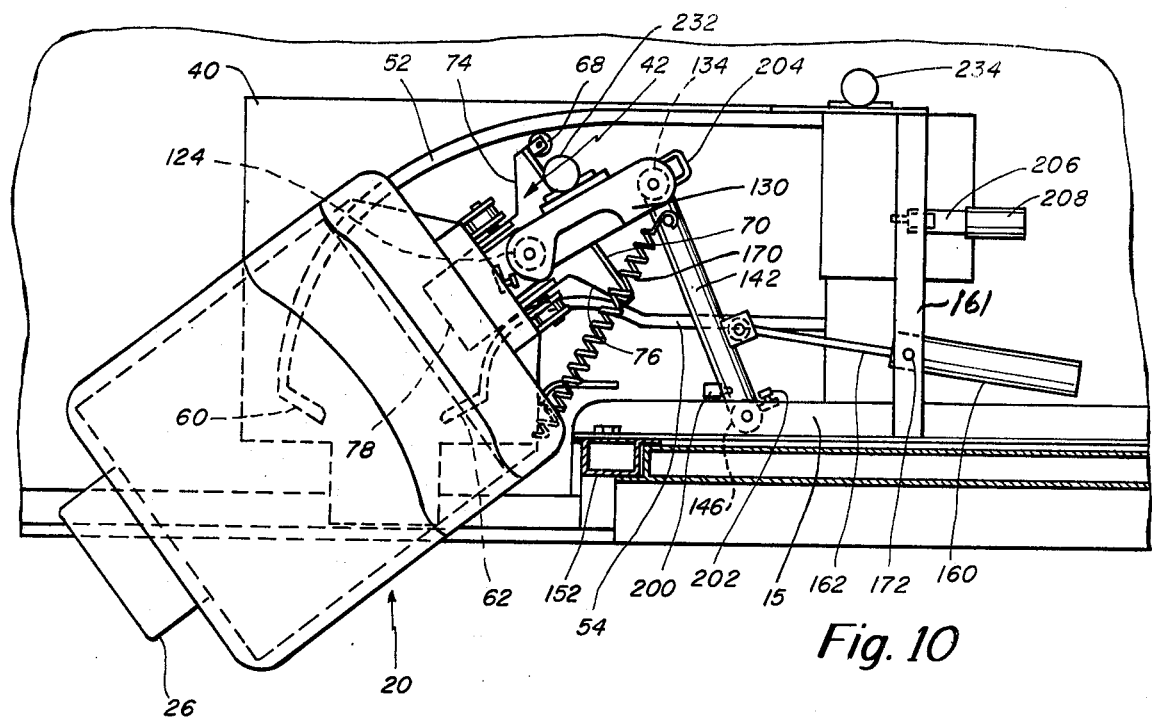

FIG. 10 is a view similar to FIG. 2 but showing the seat partially retracted within the vehicle.

Figure 11:
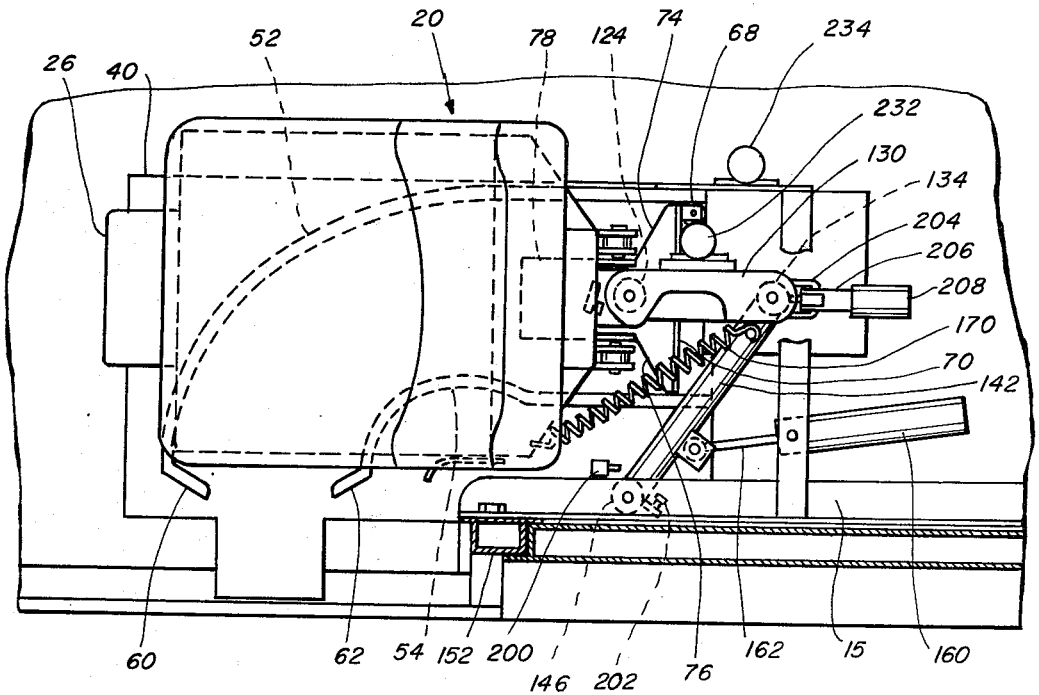

FIG. 11 is a plan view similar to FIG. 10 but showing the seat fully retracted within the vehicle.

DETAILED DESCRIPTION

Figure 1:
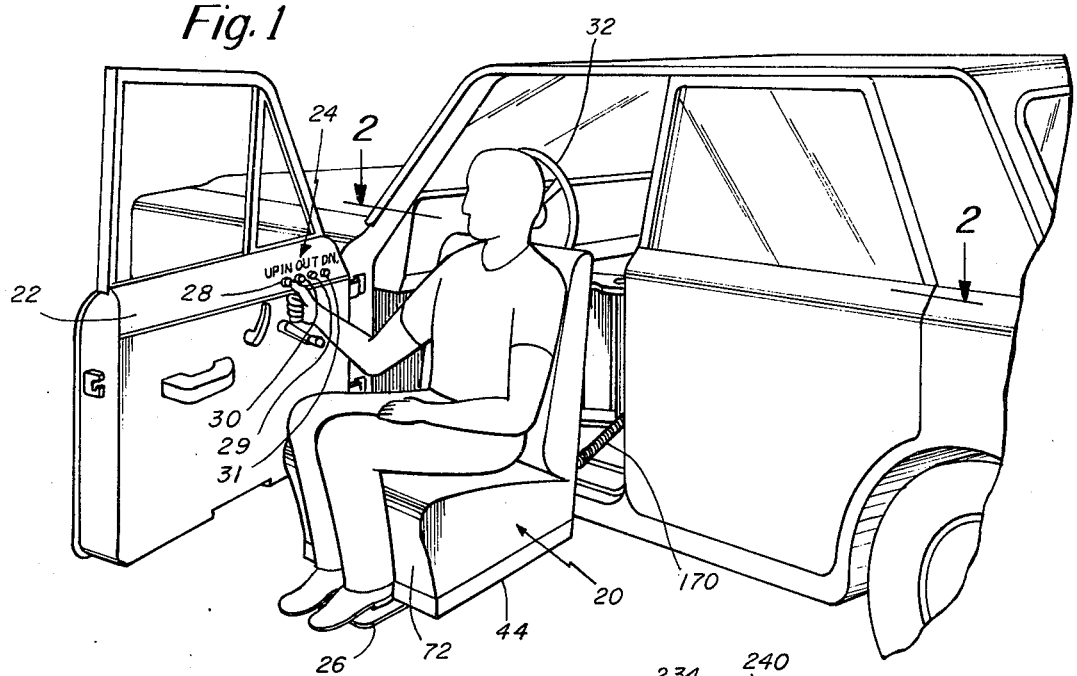
FIG. 1 is a fragmentary view of an automobile with its driver's door open and with the driver's seat fully extended from the vehicle.

In FIG. 1, the seat 20 is shown in the extended and lowered position to enable the user to get in and out of the seat most readily. The door 22 of the vehicle is fully opened and the control buttons 24 on the upper portion of the upholstered door panel are readily accessible. In FIG. 1 the occupant is shown actually seated in the seat with his feet resting on the foot rest 26 and pressing the "up" button 28 which causes the chair to elevate. Thereafter in normal use he would press the "in" button 30 which would cause the seat to swing into the vehicle to the normal position behind the wheel 32. The panel also includes "out" and "down" buttons 29 and 31 described below.

The apparatus for the chair includes a horizontal metal plate 40 which is bolted to the automobile frame on the floor of the vehicle, a trolley 42 which moves horizontally on plate 40, a seat frame 44 that carries the seat and back cushions 46 and 48 of the automobile seat, and the actuating mechanism 50 which both moves the seat in and out of the vehicle and when out of the vehicle it raises and lowers the seat.

The base plate 40 carries a pair of cam tracks 52 and 54 which control the path through which the trolley 42 moves on plate 40. Track 52 defines the outer edge of the curved path through which the trolley moves while cam track 54 defines the inner edge of that path. In FIG. 11 the trolley 42 is shown in its retracted position wherein it is positioned adjacent the inner ends 56 and 58 of the tracks 52 and 54 respectively. In that position of the trolley the seat 20 is in the normal position behind the steering wheel for operation of the vehicle. In FIG. 2 the trolley is shown in its fully extended position wherein it bears against the stops 60 and 62 at the other ends of the tracks adjacent door 22. In that position the seat 20 is fully extended out the door of the vehicle. The trolley is shown intermediate those extreme positions in FIG. 10.

The trolley is supported for motion on the base plate 40 by a ball caster 64 adjacent its forward end 66 as shown in FIG. 6, and the trolley also carries a guide roller 68 that cooperates with the outer cam track 52 to facilitate motion of the trolley. Of course additional casters may be incorporated into the trolley along with guide rollers as are necessary for smooth operation of the assembly.

The trolley itself is generally triangular in shape at its rear portion having a rear edge 70 parallel to the front edge 72 of the seat 20, and a pair of converging forward edges 74 and 76 that terminate in a narrow forward extension 78 that supports the seat elevating mechanism. That apparatus will be described in great detail below. The rear edge 70 of the trolley carries an angle iron 80 which strengthens it.

As shown in FIG. 5 the seat frame 44 includes a pair of upwardly extending angle braces 90 and 92 that are welded at the bottom to the horizontal portion of seat frame 44. The upper ends of the frame members 90 and 92 are secured to an inverted U-shaped roller track assembly 94 that includes a pair of side channels 96 and 98 connected by section 99. A pair of inner rails 100 and 102 are disposed just inside channels 96 and 98, respectively and are carried at their lower end on the forward extension 78 of the trolley. Vertical braces 104 rigidify the connection between the inner rails 100 and 102 and the trolley.

Inner rails 100 and 102 each carry a pair of rollers 106 and 108 that extend into channels 96 and 98 so that the entire seat frame 44, which includes the angles 90 and 92 and the outer rails 96 and 98, is capable of moving up and down on the inner rails 100 and 102 which in turn are fixed to the trolley 42.

Upper and lower horizontal brackets 120 and 122 respectively are secured to the inner rails 100 and 102, and a bearing tube 124 extends vertically between the two brackets behind the back of seat 20 and forms part of the mechanism for moving the seat by means of the trolley in and out of the vehicle. The bearing tube 124 is rotatably carried on a post 126 which extends axially through tube 124 and supports the tube on bearings 128. The bearing post 126 is in turn connected to upper and lower horizontal plates 130 and 132 that carry a second bearing tube assembly 134. The tubes 124 and 134 and plates 130 and 132 define a link in the drive of the trolley.

A pair of levers 142 and 144 are connected at one end, to the bearing tube 134, and their other ends are connected to the vertical pivot post 145 which is rotatably secured to the automobile frame at its lower end 148 and at its upper end to angle 150 which extends front to rear in the vehicle from the front door post 152 to the rear door post 154. This is shown in FIG. 4.

An hydraulic cylinder 160 is pivotally supported on hollow brace 161 which in turn is carried by angle 150, and its piston rod 162 extends forwardly and is pivotally connected by the coupling 164 to the upper of the two levers 142. The double acting cylinder 160 is shown in its extended position in FIG. 4 wherein the seat 20 is disposed outside the vehicle with the trolley 42 in its forwardmost position. When the cylinder is in its extended position as shown in FIGS. 2 and 4, the levers 142 and 144 pivot about the axis of post 146 so as to lie almost parallel to the center line of the vehicle. Through the bearing tubes 124 and 134 which serve as a linkage mechanism the trolley is pushed to the position shown in FIGS. 2 and 4 and the double pivots established by the bearing tubes 124 and 134 enable the trolley to negotiate the path defined by the cam tracks 52 and 54. Spring 170 stabilizes the motion of the trolley so that its center line is generally tangent to the center line of the path defined by the cam tracks.

The cylinder 160 is pivotally supported at its forward end by bracket 172 so as to accommodate the changing path of the seat trolley as it travels from the position shown in FIG. 11 through the position of FIG. 10 to the position shown in FIG. 2 and of course it also accommodates the travel of the trolley in the reverse direction from the extended position of FIG. 2 to the fully retracted position of FIG. 11.

Figure 4:
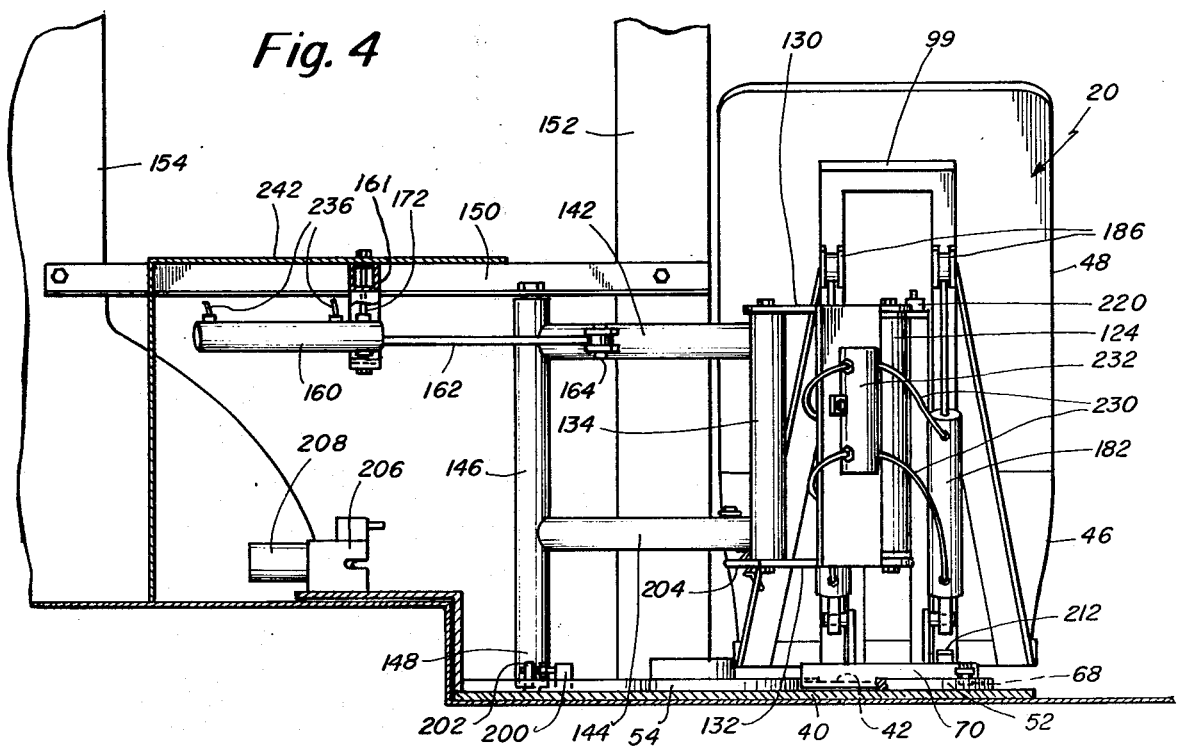
FIG. 4 is a cross sectional view taken along the corresponding section line 4—4 in FIG. 3.

The seat frame 44 is raised and lowered on the inner rails 100 and 102 by means of the double acting hydraulic cylinders 180 and 182 shown in FIGS. 4 and 7. The lower end of each cylinder is connected to a vertical brace 104 that rigidifies the trolley and inner rails 100 and 102, and the upper ends of the pistons of those cylinders are connected to the brackets 186 mounted on the rear faces of the outer rails 96 and 98 as shown in FIGS. 3, 6 and 7. When the cylinders are extended, the pistons elevate the outer rails 96 and 98 which in turn raise the seat to a position in which the seat may be moved into the vehicle. Essentially the elevated position of the seat is the operative position of the seat when retracted inside the car. When the trolley is outside the automobile to its extended position the pistons may be retracted so as to lower the seat to the position of FIG. 1 wherein the occupant of the vehicle can readily alight from the seat.

A number of limit switches are incorporated into the assembly to limit the travel of the trolley back and forth along the path defined by the cam tracks 52 and 54 and the vertical travel of the seat frame on the trolley when the seat is disposed outside the vehicle. Limit switch 200 shown in FIGS. 2, 4, 10 and 11 is mounted on the plate 40 adjacent pivot post 146. The post carries a lug 202 which will engage the switch 200 so as to stop the forward motion of the trolley when the post has rotated to a position wherein the seat is outside the door of the vehicle (see FIG. 2). In the rearward position, a bail 204 carried on the bearing tube 134 is captured by a latch 206 operated by solenoid 208 so as to hold the seat in that position. It is particularly important that the seat be held firmly in place when in the driving position to react against the forces generated by a sudden deceleration of the vehicle. And limit switch 205 mounted on the latch 206 is engaged by bearing tube 134 as shown in FIGS. 9 and 10 to limit the rearward travel of the trolley.

An upper limit switch 210 shown in FIGS. 3, 6 and 9 mounted on trolley 42 is positioned to be engaged by lug 212 carried on the outer track 98 to limit the upward travel of the seat frame. A lower limit switch 220 is shown in FIG. 6 mounted on the upper bracket 120 and is disposed in the path of travel of lug 22 carried on the cross arm 99 of the outer track assembly 94. As the seat is lowered by the cylinders 180 and 182 and their respective pistons, the lug 122 engages the limit switch 220 to stop further operation of the cylinder.

The cylinders 180 and 182 which raise and lower the seat are connected by means of tubing 230 to pump 232. The pump in turn is controlled by actuating circuit not shown which includes the limit switches 210 and 220 that automatically stop the operation of the pump when the limits of travel are reached. A second pump 234 is connected by tubing 236 to hydraulic cylinder 160, and the pump 234 in turn is controlled by an actuating circuit not shown which includes the solenoid 208 of the latching mechanism for the seat and the limit switches 200 and 205.

In FIG. 2, a battery 240 is shown mounted adjacent a cover 242 which may enclose the rear portion of the base plate 40, cylinder 160 and portions of the actuating mechanism for the trolley, particularly when the trolley is in the rear position fully withdrawn into the vehicle. While the battery is shown within the vehicle, it of course may just as readily be mounted under the hood and may be charged from the vehicle motor.

In use, the handicapped operator would approach the vehicle in his wheelchair, open the door 22 and press the "out" button 29 on the panel 24. Merely by pressing the button 29, the latch 226 released the bail 204 and pump 234 is placed in operation and directs hydraulic fluid to the rear of cylinder 160 which extends the piston 162 which in turn acts upon the lever 142 causing the lever to pivot on the pivot post 146. The ends of levers 142 and 144, connected to the linkage composed of the two bearing tubes 124 and 134 and the plates 130 and 132, push the trolley from the position shown in FIG. 11 through the position shown in FIG. 10 to the extended position of FIG. 2 where limit switch 200 is engaged. The operator then presses the "down" button 31, and the extended seat 20 drops to the position suggested by the broken lines in FIG. 3 with the frame 44 just a few inches off the ground. It is then a relatively easy matter for the operator to shift himself from the wheelchair to the seat 20. The downward travel of the chair to the dotted line position of FIG. 3 is limited by the limit switch 220 and the cooperating lug 222.

Once the operator is in the chair 20 in the position of FIG. 1, he then presses the "up" button 28 which causes the chair to elevate until the limit switch 210 is engaged by the lug 212. Next, he presses the "in" button 30, and the seat is retracted into the car, passing through the position of FIG. 10, to the position of FIG. 11, where the latching device 206 engages bail 204 to lock the seat in the retracted position, and the limit switch 205 shuts off the pump 234. In that position, the operator is seated behind the steering wheel 32 and is in the correct driving position.

From the foregoing description those skilled in the art will appreciate that numerous modifications may be made of this invention without departing from its spirit. For example, while the assembly of this invention is shown as utilized for a driver's seat, it will be appreciated that the invention may be applied equally to a passenger seat either behind the driver's seat or on the other side of the vehicle.

Because modifications may be made of this invention without departing from its spirit, it is not intended that the breadth of this invention be limited to the specific embodiment illustrated and described. Rather, it is intended that the scope of this invention be determined by the appended claims and their equivalents.

What is claimed is:

1. A movable seat for vehicles comprising
    a base plate adapted to be secured to the vehicle floor,
    a trolley movable on the base plate,
    a seat frame mounted on the trolley and carrying a vehicle seat,
    guide means on the base plate and trolley for confining the movement of the trolley on the base to a prescribed path on the vehicle, said path including one station for the trolley which places the seat in a normal position within the vehicle and a second station wherein the seat lies wholly outside the vehicle,
    lift means supporting the seat on the trolley at a height suitable for operation of the vehicle when the trolley is in the one station and for lowering the seat from that height when the trolley is in the second station and the seat lies outside the vehicle to make it easier for a handicapped person to alight from the vehicle,
    and actuating means connected to the trolley means for automatically moving the trolley between the two stations.

2. A movable seat for vehicles as described in claim 1 further characterized by
    said guide means including a segment that confines the trolley movement between said stations to a path which extends front to back in the vehicle and a second segment which is a continuation of the first segment and which is arcuate and turns the trolley toward the door of the vehicle adjacent the edge of the vehicle floor at the door.

3. A movable seat for vehicles as described in claim 1 further characterized by
    said actuating means including a lever pivotally connected to the vehicle frame at one end,
    a linkage connected at one end to the trolley and at the other end to the other end of the lever,
    and cylinder means connected to the lever and fixed to the frame for pivoting the lever and thereby driving the trolley through the linkage.

4. A movable seat for vehicles as described in claim 1 further characterized by
    said lift means including a substantially vertical first track means mounted on and movable with the trolley,
    and second track means connected to the seat frame,
    roller means for guiding the second track means on the first track means for raising and lowering the seat frame on the first track means,
    and cylinder means mounted on the trolley and connected to the second track means for automatically raising and lowering the seat frame.

5. A movable seat for vehicles as described in claim 3 further characterized by
    said cylinder means including an hydraulic cylinder pivotally mounted on the frame and a piston pivotally connected to the lever intermediate the ends thereof.

6. A movable seat for vehicles as described in claim 5 further characterized by
    said lift means including a substantially vertical first track means mounted on and movable with the trolley,
    and second track means connected to the seat frame,
    roller means for guiding the second track means on the first track means for raising and lowering the seat frame on the first track means,
    and cylinder means mounted on the trolley and connected to the second track means for automatically raising and lowering the seat frame.

7. A movable seat for vehicles as described in claim 5 further characterized by
    the cylinder means for raising and lowering the seat including
    at least one hydraulic cylinder mounted on the trolley and having a piston connected to the second track means for pushing and pulling the second track means up and down on the first track means.

8. A movable seat for vehicles as described in claim 7 further characterized by
    a control circuit including a panel of switches mounted in the vehicle and operatively connected to each of the hydraulic cylinders for enabling the operator while in the seat to operate them.

9. An automobile having a frame, driver's seat, steering wheel and an improved mounting means for the seat; said mounting means comprising
    a horizontal base plate mounted on the vehicle floor and secured to the frame,
    a pair of generally parallel tracks mounted on the plate and having a rear portion that extends back to front behind the steering wheel and a second portion that is generally arcuate and extends from the front of the rear portion forwardly and turns toward the front door, a trolley supported on the plate and a seat frame and seat carried by the trolley, said trolley being movable along the tracks between a rear station at the rear portion of the tracks in which the seat frame faces forward toward the steering wheel and a second station at the opposite end of the front portion of the tracks in which the seat faces to the side and is disposed wholly outside the vehicle, and actuating means connected to the trolley for moving it between the stations and when the seat frame and seat lie outside the vehicle for lowering the seat frame and seat on the trolley from the elevation of the seat when it is inside the vehicle and returning the seat to that elevation before it is returned inside the vehicle.

10. An automobile as defined in claim 9 further characterized by said actuating means including a lever and link connected to the frame and trolley, and hydraulic means connected to the lever for automatically moving the trolley.

11. An automobile as defined in claim 9 further characterized by said actuating means including tracks mounted on the trolley and the seat frame for movably supporting the seat frame on the trolley, and hydraulic means connected to the trolley and seat frame for automatically raising and lowering the seat frame.

12. An automobile as defined in claim 11 further characterized by means preventing the trolley from moving from the second station unless the seat frame is raised to its elevated position on the trolley.

13. An automobile as defined in claim 9 further characterized by said trolley when in the second station supporting the seat frame entirely outside the vehicle, and said actuating means being capable of lowering the seat frame to within a few inches of the ground when the frame is outside the vehicle.

14. An automobile as defined in claim 9 further characterized by a control panel for operating the actuating means mounted on the door and within reach of the occupant in the seat in all positions of the seat frame and trolley.

15. An automobile as defined in claim 1 further characterized by a foot rest secured to the seat frame and movable in and out of the vehicle with the seat and down and up with the seat when the seat is disposed outside the vehicle.

* * * * *